Sept. 3, 1940.  J. K. WEBB  2,213,875
ELECTRIC POWER CABLE
Filed Feb. 11, 1938   5 Sheets-Sheet 1
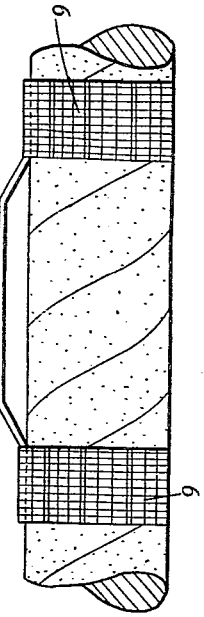
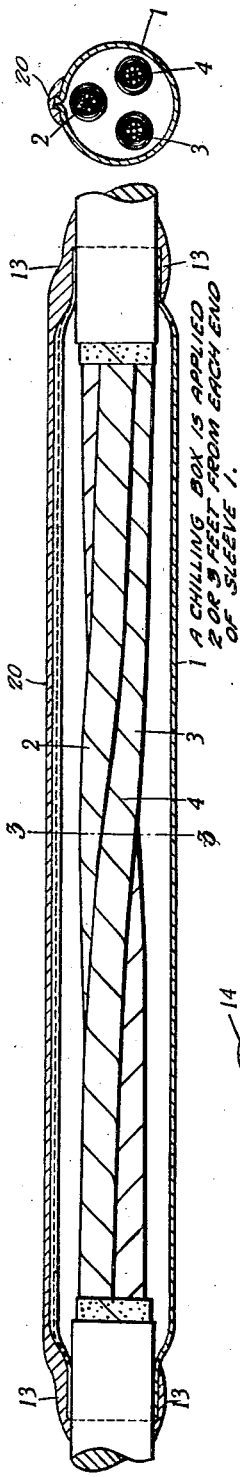
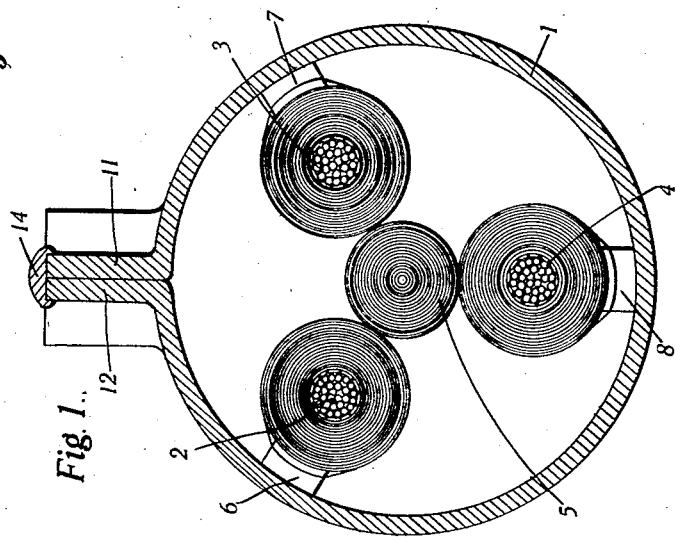
INVENTOR:-
JOHN KRAUSS WEBB
BY
E. O. Kinney
ATTORNEY.

Sept. 3, 1940.                J. K. WEBB                2,213,875
                        ELECTRIC POWER CABLE
                    Filed Feb. 11, 1938        5 Sheets-Sheet 2
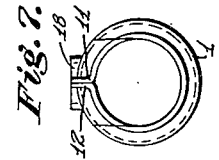
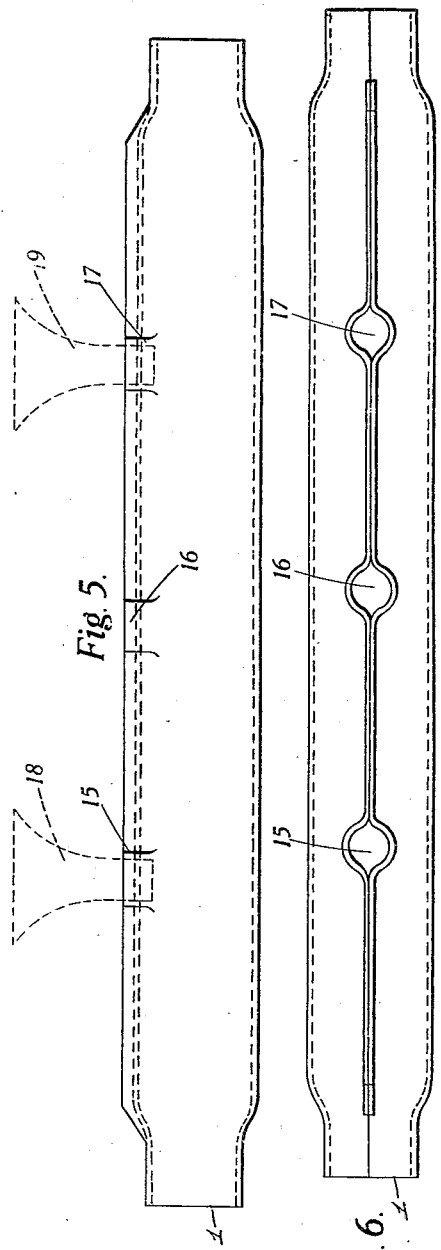
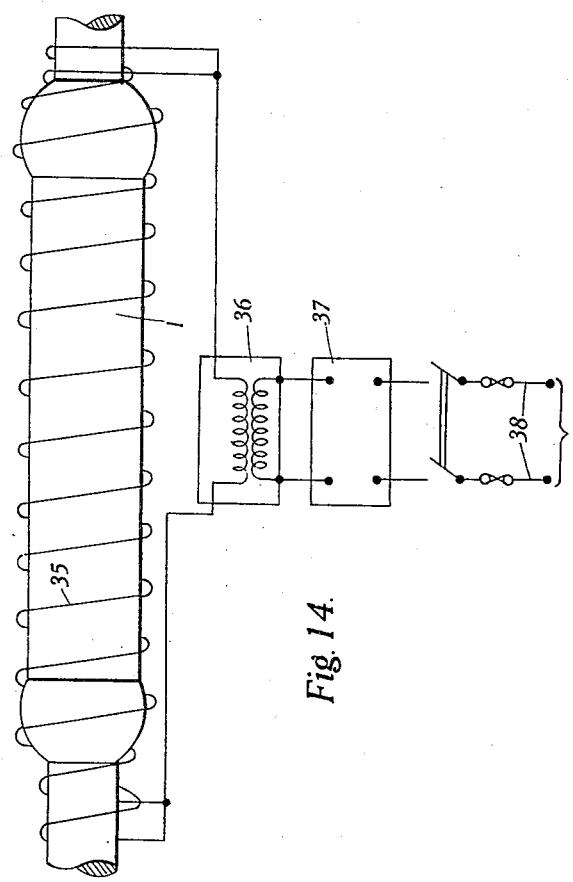
Inventor
John Krauss Webb
by
E. H. O'Kinney
Attorney

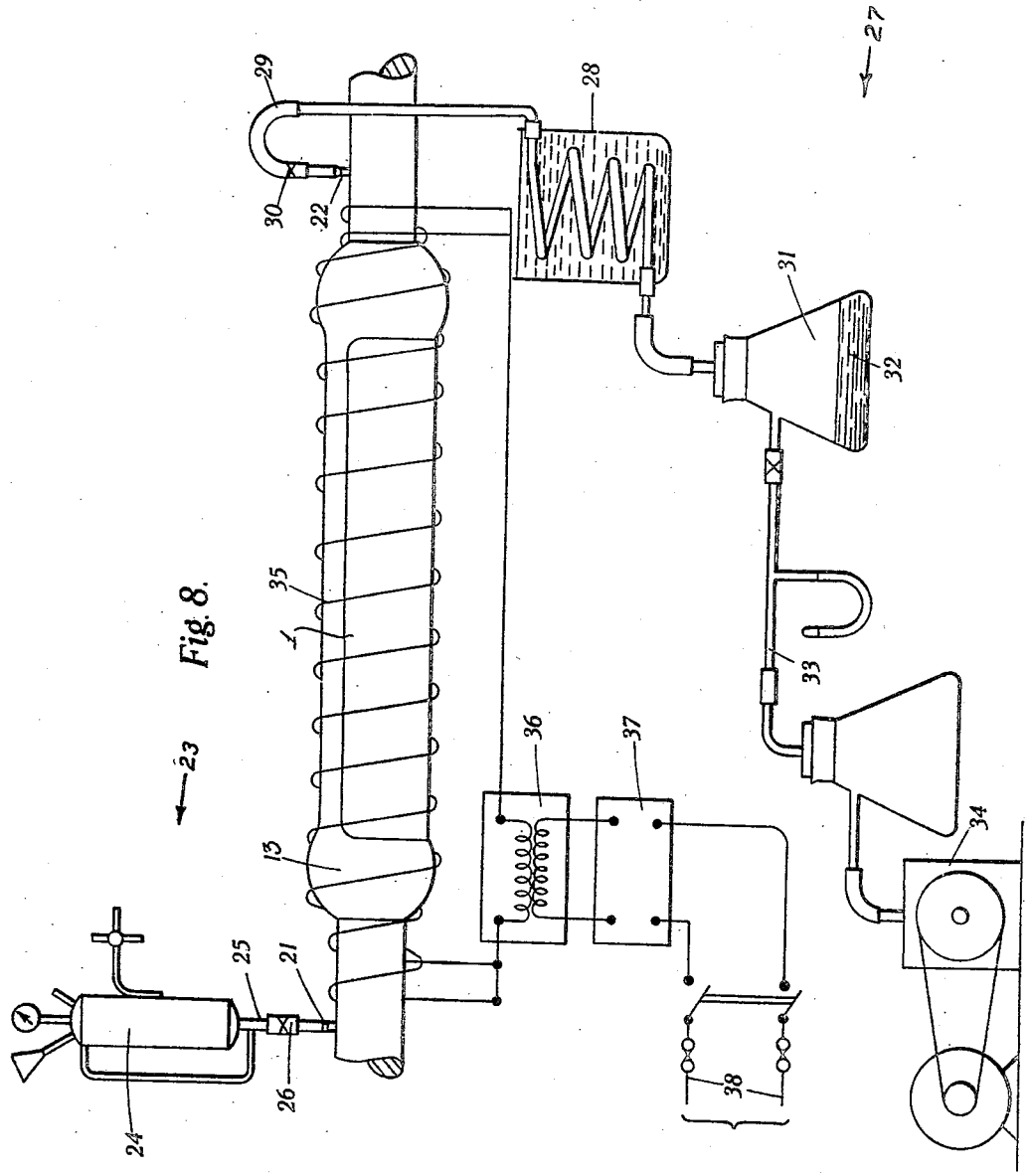

Sept. 3, 1940.   J. K. WEBB   2,213,875
ELECTRIC POWER CABLE
Filed Feb. 11, 1939   5 Sheets-Sheet 4

Inventor
John Krauss Webb
by Ed D Phinney
Attorney

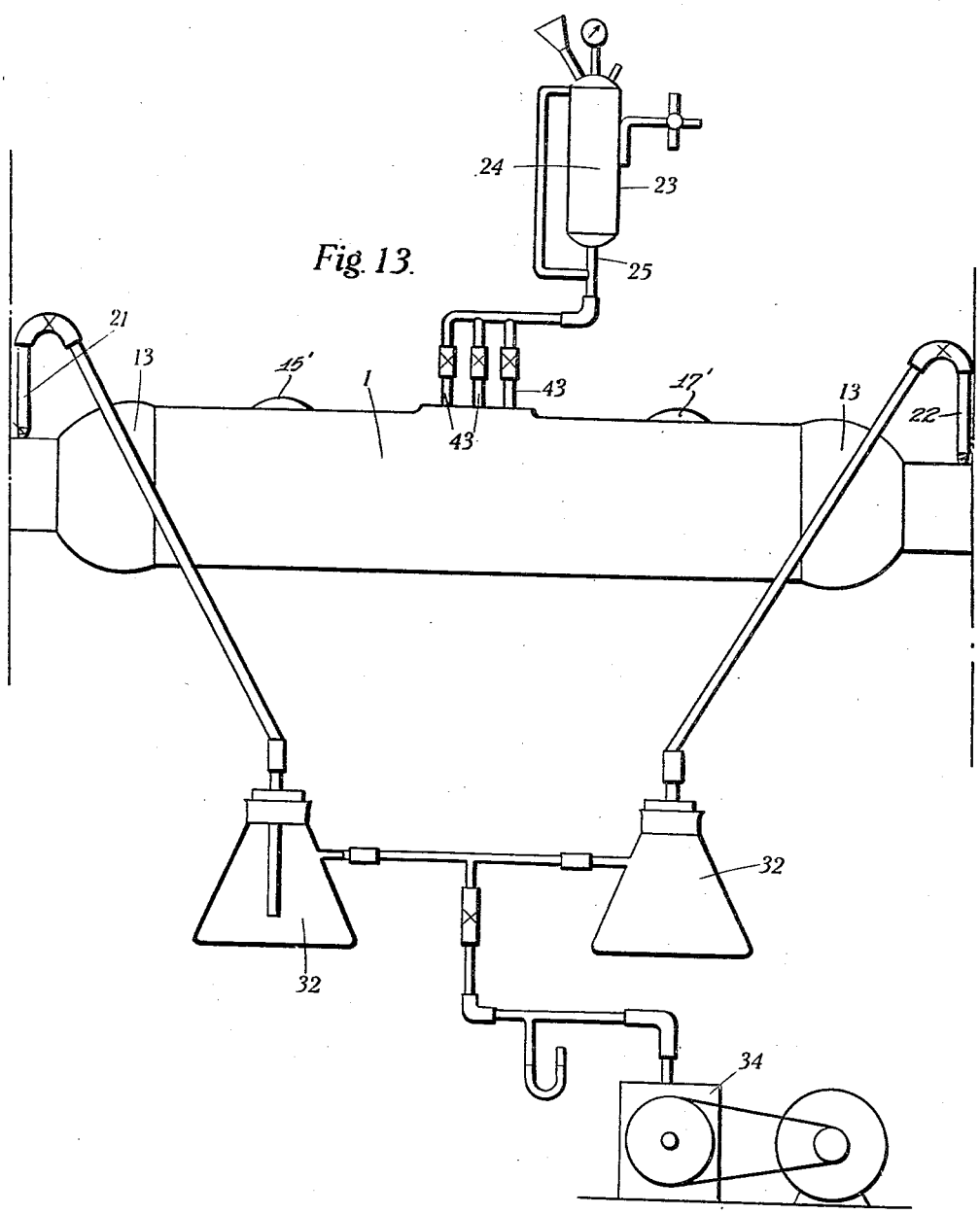

Patented Sept. 3, 1940

2,213,875

UNITED STATES PATENT OFFICE 2,213,875

ELECTRIC POWER CABLE

John Krauss Webb, London, England, assignor to International Standard Electric Corporation, New York, N. Y.

Application February 11, 1938, Serial No. 190,054
In Great Britain March 19, 1937

13 Claims. (Cl. 174—22)

This invention relates to impregnated cables and more particularly to a method of forming liquid resisting barriers in such cables.

In prior U. S. applications Numbers 35,960 and 67,308 and U. S. Patent No. 2,105,567, issued January 18, 1938, I have described the provision of styrene barriers in the form of joints, plugs and terminations in electric power cables. Difficulty has however, been found in applying the methods described, to multi-core cables in that the polymerisable material is not readily caused to flow into the insulations surrounding the cores due to the fact that the worming spaces between the cores present a path of relatively low fluid resistance and therefore the polymerisable material tends to flow along the worming spaces and does not penetrate the core insulation. It is an object of the present invention to overcome the above difficulty.

According to the present invention there is provided a method of forming a liquid resisting barrier in an impregnated multi-core cable consisting in removing the wormings between the cores for the length of the required barrier, filling the spaces with mobile material, that is material in liquid or plastic form, adapted to solidify within the spaces and forming a barrier of polymerised material in the insulation around the cores. In the well known Hochstadter cable or H type cable such as described, for example, in British Patent 7,766 of 1914 to Martin Hochstadter in which screened cores are employed metal may be utilised for filling the spaces between the cores but in belted cables in which the cores are not screened it is essential to employ insulating material to form the barrier in the worming spaces because the said spaces are in the electric field.

The present invention may be used with advantage in connection with the joints, plugs and terminations described in prior U. S. applications Number 35,960 and 67,308, and U. S. Patent No. 2,105,567, issued January 18, 1938, mentioned above. It may also be used in combination with the method described in co-pending U. S. application No. 190,053 in which there is disclosed a method of providing a liquid resisting barrier in an impregnated cable comprising introducing a solvent into the cable insulation to dissolve out the impregnant at that part of the cable at which the barrier is to be formed, removing the solvent and dissolved impregnant from the cable and then introducing a polymerisable material such as styrene into that part of the cable from which the impregnant has been removed and thereafter polymerising the said material to form a barrier in the cable.

In the above methods the formation of the barrier in the worming spaces between the cores directs the monomeric styrene or solvent into the insulation around the cores and thus overcomes the difficulty mentioned above. The present invention may also be used in connection with paper tapes which are impregnated with monomeric styrene, in the preparation of a joint, and in such a case further styrene may be applied to the paper tapes after completion of the barrier in the worming spaces or sufficient styrene may have been applied to the tapes prior to making the joint in which case the difficulty mentioned above does not arise but one advantage is that the heat of the filling material assists in polymerising the styrenated papers and a convenient construction of joint is provided.

It may be mentioned that, in general, each core will be made up of several strands of wire and therefore it is important to add sufficient polymerisable material to the insulation surrounding the cores to ensure that the spaces between the strands of wire are filled up to complete the barrier.

The application of the invention to the preparation of a styrene metal filled plug in a three core H type cable will now be described in connection with the drawings, in which:

Fig. 1 is a cross-section of the cable with a sleeve, arranged to surround the plug in position;

Fig. 2 is a longitudinal section of plug in the course of preparation,

Fig. 3 is a section on the line 3—3 of Fig. 2,

Fig. 4 is a detail view of a part of a single core in elevation,

Figs. 5, 6 and 7 are detail views of the sleeve in side and end elevation,

Figure 9:
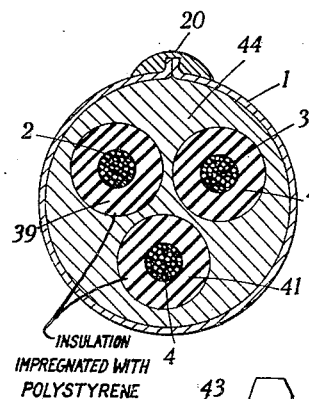
Figure 10:
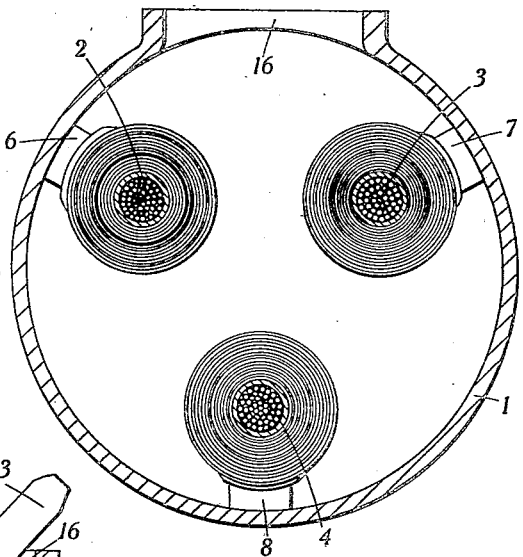
Figure 11:
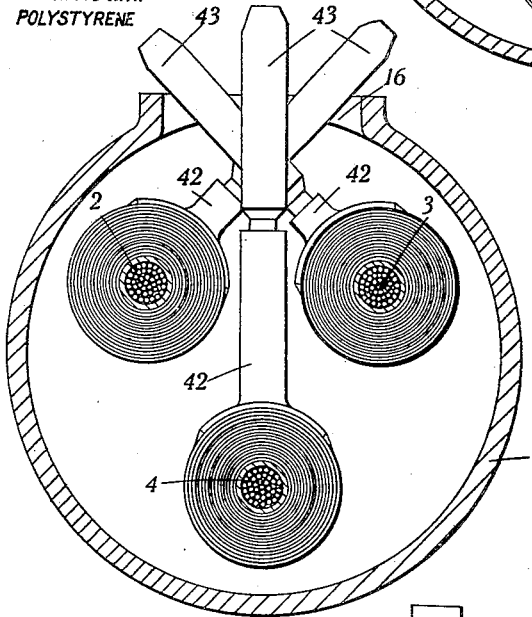
Figure 12:
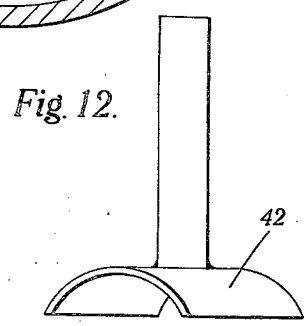
Figure 12A:
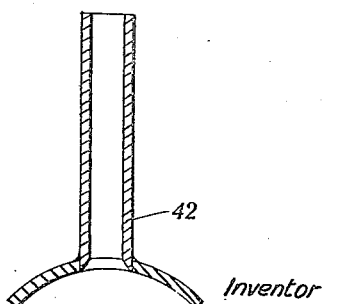

Fig. 8 is a diagrammatic view of a plant for applying styrene to the insulation, and Fig. 9 is a view of the finished plug in section, Fig. 10 is a section of a length of cable with a sleeve surrounding the cores and spacers in position between the cores and the sleeve, Fig. 11 is a similar view to Fig. 10 with means for applying solvent and styrene to the insulation in position, Figs. 12 and 12a show a perspective view and a section of a filling attachment, Figs. 13 and 14 are diagrammatic views showing apparatus for applying styrene to the insulation and for heating the sleeve.

The first step in preparing a plug in a three core H type cable is to remove the armouring and the lead sheath from the length of the cable required for styrenation and to dispose chilling boxes about two or three feet each side of the plug position. The cable shown in Fig. 1 comprises three insulated cores 2, 3, 4, each comprising a number of conductors, the said cores 2, 3, 4 being disposed in spaced relation and being provided with a sleeve 1 to surround the finished plug. The cores 2, 3, 4 are separated from one another at the plug position by insulating spacers 5 which may be in the form of paper rolls and from the inner wall of the sleeve 1 by spacers 6, 7, 8 which are in the form of short lengths of copper or the like (see Fig. 4).

Having removed the armouring and the lead sheath from the requisite length of cable, the wormings between the cores are removed from the cable for the length of the plug and the spacers 5 placed in position. In order to prevent or minimise damage to the insulation around the cores during pouring in of the metal when forming the metal filling the insulation surrounding each core 2, 3, 4 is provided with a protective binding 9 (Fig. 4) at points which will be positioned below pouring holes in the metal sleeve 1. The bindings 9 are used to retain the spacers 6, 7, 8 in position (Fig. 4 shows spacer 6 so retained).

The aforesaid sleeve 1 may be a longitudinally split cylindrical member provided with meeting flanges 11, 12 which are clamped together by small hand clamps (not shown). After placing the sleeve 1 in position a wipe joint 13 is provided at each end of the sleeve 1 between the said sleeve 1 and the cable sheath and a finger wipe 14 (see Fig. 1) is made, along the top of the flanges 11, 12. After completion of the wipes 13, 14 the clamps may be removed.

Referring more particularly to Figs. 5 and 6, it will be observed that the sleeve 1 is provided with three filling holes 15, 16, 17 into at least two of which filling cones or funnels 18, 19 are inserted. Two of these filling cones 18 and 19 which are preferably made of copper are shown in position in Fig. 5 and through them the metal is poured into the cable to form the metallic part of the plug. A suitable metal is that known as plumbers' metal and if about 100 lbs. of this is heated to 250–255° C. and poured into the filling cones a satisfactory result will be obtained. The sleeve may be heated with a blow lamp during pouring but precautions should be taken to prevent the hot flame playing on the wipe joints 13 or the finger wipe 14. As the metal within the sleeve cools and solidifies the level may be topped up as required. When cooling of the metal is complete the filling cones 18, 19 should be removed and the flanges 11, 12 cut down from the upstanding position shown in Fig. 1 to about the height shown in Fig. 3 (e. g., ¼ inch) and a wipe 20 is thereafter applied to cover the flanges 11, 12. The application of the metal filling to the plug is then complete.

Having completed the metal filled part of the plug the polymerisable material may be applied as described in prior U. S. application No. 67,308, but preferably a solvent is employed to dissolve out the impregnant as described in co-pending U. S. application 190,053 and the following description includes the use of a solvent. In order to pass solvent into the insulations surrounding the conductors 2, 3, 4, nipples 21, 22, preferably copper cadmium nipples, should be inserted into the cable sheath about 2½ feet from the wipe 13 at each end of the sleeve 1. The chilling boxes (not shown) should then be filled with a substance such as $CO_2$ snow and the apparatus shown in Fig. 8 set up. The apparatus shown in Fig. 8 may conveniently be divided into three parts, solvent inlet apparatus indicated generally at 23 and comprising a reservoir 24 in the form of a bomb connected to the nipple 21 by a rubber or like tube 25 provided with a flow regulating device 26. The second part of the apparatus in Fig. 8 is the solvent withdrawal and condensation plant indicated generally at 27 and comprising a condenser 28 connected to the nipple 22 by a rubber or like tube 29 provided with a regulating device 30. A vessel 31 is provided for collecting the condensate 32 and from the vessel 31 a tube 33 leads to vacuum producing apparatus 34. The third part of the apparatus shown in Fig. 8 is the sleeve heating means which comprises a winding 35 (preferably a double winding) connected to the secondary of a transformer 36 supplied through an adjustable transformer control 37 which is preferably of the continuously variable type sold under the name "Variac." This "Variac" is in turn supplied from a suitable source of supply for example the mains 38.

Before applying the solvent to the cable the sleeve should be heated up to about 110° C. by passing a current of suitable strength through the windings 35 which preferably comprise ½ inch annealed copper strip wrapped with cotton tape. The reservoir 24 should be filled with solvent, for example crystallisable benzene and when the cable has been sufficiently chilled e. g. for not less than half an hour, the benzene should be passed in through inlet nipple 21 and out through outlet nipple 22 into the vessel 31 until the benzene arriving at the outlet nipple 22 is clear. The vacuum apparatus 34 should be employed as required.

After the benzene has become clear at the outlet nipple 22, i. e., after the greater part of the oil has been removed the supply should be cut off and the benzene in the cable boiled off so that the insulation is ready for styrenation. The reservoir 24 should then be filled with styrene which is passed through the cable until clear styrene is reaching the outlet nipple 22 whereupon the outlet nipple should be closed and a pressure of about 5 lbs. per square inch applied to the reservoir 24 for a period of about 72 hours, during which time the sleeve should be heated to about 120° C. to polymerise the styrene. Thereafter the filling, heating and removing apparatus should be dismantled, nipples 21 and 22 removed and sealed by the lead burning process.

It will be understood that at the completion of the above operations a styrene metal plug has been produced in the cable. Referring to Fig. 9 of the drawings, which shows a cross-section of a completed plug 2, 3, 4 are the cores, 39, 40, 41 indicates insulation impregnated with polymerised styrene to form part of the plug, 44 is the metal part of the plug, filling that part of the space within the sleeve 1 not closed by the styrene.

The application of the present invention to the preparation of a metal styrene joint in a three core 'H' type or screened cable will now be described in connection with Figs. 10–14 inclusive of the drawings.

In the following description parts corresponding to the equivalent parts in Figs. 1 to 9 will be given the same reference numerals.

In the preparation of the joint the preliminary work and the jointing of the conductors is carried out in the usual manner; it may be mentioned however, that it is preferable to employ connecting ferrules which have a central partition to prevent any chance of the passage of impregnant along the cores. The core insulation around the joint is completed by the application of impregnated paper tapes in the usual way and finished overall with H paper i. e., metalized paper and lead foil. In Fig. 10 the cores 2, 3, 4 are held in spaced relation from the walls of the sleeve 1 by the spacers 6, 7, 8, which are held in position on the insulation of the conductors in the manner previously described in connection with Fig. 4. Special fittings 42 are provided and shaped so that when in position they can slide freely over the insulation surrounding cores 2, 3, 4. The fittings 42 are shown in position in Fig. 11 with nipples 43 projecting into the open upper end thereof, the said nipples being soldered in position within the fittings 42.

In the case of a joint the sleeve 1 is preferably constructed rather differently than in the case of a sleeve adapted for use in preparing a plug. The jointing sleeve 1 may be a tubular member provided with holes therein (e. g., 15, 16, 17 as in Figs. 5 and 6) but not split longitudinally, because it may be slipped over the cores and moved lengthwise over the cable insulation before jointing of the cores. After the sleeve has been secured in position by wipe joints 13, and after fittings 42 have been positioned as above described, the metal may be poured in through the holes 15 and 17 as previously described in order to provide a metal plug surrounding the jointed cores 2, 3, 4.

The styrenation may then be carried out as described in prior U. S. Patent 1,105,567, issued January 18, 1938, but preferably a solvent, e. g., benzene is employed to dissolve out the impregnant as described in co-pending U. S. application 190,053, and the following description includes the use of such a solvent.

The next step in the preparation of the joint is to run the solvent through the cores; this is effected by means of the apparatus shown in Fig. 13 which is very similar to the apparatus previously described, heating of the sleeve 1 being effected by the apparatus shown in Fig. 14. Briefly, vacuum is applied to the joint through the nipples 21 and 22 for about 15 to 20 minutes and thereafter benzene is flushed through one insulated core, e. g., core 2, until the benzene is running clear, then the second and third cores are treated in a similar manner, the benzene being introduced through the nipples 43 which fit into the fittings 42. Then all cores 2, 3, and 4 may be flushed through together for a few moments. Thereafter styrene may be applied to the cores in a manner similar to that described for the benzene, first by passing the styrene through each of the cores one after another, and then through all the cores together. Polymerisation may then be effected by heating the joint to about 120° C. for about 60 hours by means of the heating coil after which the nipples are removed, the holes on the cable sheath being filled or sealed by the lead burning process, and the filling holes in the middle of the joint being wiped over as shown at 15', 17' in Fig. 13. After completion of the application of styrene to the core insulation the nipples inserted into the fittings 42 are removed by heating the nipples sufficiently to permit their removal and the holes are then filled up with metal, but obviously the fittings 42 remain embedded in the metal.

In an alternative method of building up the insulation around the cores at a joint or termination paper tapes impregnated with a suitable compound may be immersed in or soaked with monomeric styrene or other suitable monomer for a few hours prior to the application of the papers to the joint or termination. By this method considerable quantities of the compound forming the original impregnant of the paper tapes, e. g., the generally employed wax-like compound known as "Halowax" may be dissolved out from the tapes by the styrene or other monomer, and any residual compound remaining is saturated with the monomer. Then using the technique of U. S. Patent 2,105,567 in combination with the present invention, excellent results may be obtained. If desired, the retarding effect of the residual compound upon polymerisation can be minimised or neutralised by including an accelerator in the monomer, e. g., in the case of styrene, an organic peroxide such as benzoyl peroxide, up to 1%, is very efficacious.

As an alternative the insulation around the cores at a joint or termination may be built up by utilising prepolymerised papers which may have been produced in accordance with U. S. Patent No. 2,147,824. In this way the barrier is first formed in the insulation around the cores by utilizing the prepolymerised tapes and thereafter the worming spaces are filled with metal or other suitable compound as described above.

Another possibility in building up the insulation around the cores is to utilise paper tapes impregnated with a suitable stabilised monomer, e. g., papers impregnated with monomeric styrene stabilised by the addition of a small percentage of quinone, which prevents or inhibits polymerisation. The advantage of quinone as a stabiliser in such tapes is that the stabilising action of quinone is destroyed by heating substantially without driving off any of the quinone in vapour form, so that the formation of voids is substantially prevented.

What is claimed is:

1. A method of providing a liquid resisting barrier in an impregnated multicore cable consisting in removing the wormings between the cores for the length of the required barrier, filling the spaces with material in mobile form adapted to solidify and form a barrier within the said spaces and thereafter forming a barrier of polymerised material in the insulation around the conductors of the cores.

2. A method of providing a liquid resisting barrier in an impregnated multicore screened type cable consisting in removing the wormings between the cores for the length of the required barrier, filling the spaces with molten metal so that when solid the metal forms a barrier in the said spaces and thereafter forming a barrier of polymerised material in the insulation around the conductors of the cores.

3. A method of providing a liquid resisting barrier in an impregnated multicore belted cable consisting in removing the wormings between the cores for the length of the required barrier, filling the spaces with insulating material applied in mobile form, replacing the belt insulation and thereafter forming a barrier of polymerised material in the insulation around the conductors of the cores and in the belt.

4. A method according to claim 1, characterised in this, that after completion of the barrier in the worming spaces polymerisable material is fed into the insulation around the conductors of the cores to replace the original impregnant and is polymerised therein to complete the barrier.

5. A method according to claim 1, characterised in this, that after completion of the filling in of the worming spaces a solvent is passed through the core insulation to dissolve out the original impregnant, after which the solvent and dissolved impregnant are replaced by a polymerisable material which is polymerised in situ to complete the barrier.

6. A method according to claim 1 of making a barrier at a point of connection, characterised in this, that paper tapes for building up the insulation are impregnated with polymerisable material such as monomeric styrene prior to application to the joint or termination.

7. A method according to claim 1 of making a joint characterised in this, that paper tapes impregnated with polymerised material such as polystyrene are employed to build up the insulation at the joint.

8. A method according to claim 1, characterised in this, that after completion of the filling in the worming spaces a solvent is passed through each core individually and then through the cores simultaneously to dissolve out the original impregnant and that the polymerisable material is then applied in a similar manner and thereafter polymerised in situ.

9. A liquid resisting barrier in a multicore cable (e. g., of the screened type) consisting of a metallic filling in the worming spaces and a polymerised insulating filling in the insulation around the conductors of the cores.

10. A liquid resisting barrier in a multicore belted cable consisting of a filling of insulating material in the worming spaces between the cores and a polymerised filling distinct from said first mentioned filling in the insulation around the conductors of the cores.

11. A method of providing a liquid resisting barrier in an impregnated multi-core cable consisting in removing the wormings from between the cores for the length of the required barrier, filling the spaces with material in mobile form adapted to solidify and form a barrier within the said spaces, thereafter feeding polymerisable material into the insulation directly surrounding the conductor of each core and polymerising the said material to complete the barrier.

12. A method of providing a liquid resisting barrier in an impregnated multi-core cable consisting in removing the wormings from between the cores for the length of the required barrier, filling the spaces with material in mobile form adapted to solidify and form a barrier within said spaces, thereafter feeding monomeric styrene into the insulation directly surrounding the conductor of each core, and polymerising the styrene to complete the barrier.

13. A method of providing a liquid resisting barrier joint in an impregnated multi-core cable comprising removing the wormings from between the cores of each cable length to form a space equal to the length of the required barrier joint, jointing the conductors, building up the insulation around the conductors, disposing a protective sleeve around the joint, filling the worming spaces from which the wormings have been removed with material in mobile form adapted to solidify and form a barrier within the said spaces, and finally forming a barrier of polymerised material in the insulation directly surrounding the conductors of the cores.

JOHN KRAUSS WEBB.